US011403372B2

(12) United States Patent
Durand et al.

(10) Patent No.: US 11,403,372 B2
(45) Date of Patent: Aug. 2, 2022

(54) SYSTEMS, METHODS, AND STORAGE MEDIA FOR OBFUSCATING A COMPUTER PROGRAM BY REPRESENTING THE CONTROL FLOW OF THE COMPUTER PROGRAM AS DATA

(71) Applicant: IRDETO CANADA CORPORATION, Ottawa (CA)

(72) Inventors: Robert Durand, Ottawa (CA); Andrew Hoyt, Amsterdam (CA)

(73) Assignee: Irdeto Canada Corporation, Ottawa (CA)

( * ) Notice: Subject to any disclaimer, the term of this patent is extended or adjusted under 35 U.S.C. 154(b) by 837 days.

(21) Appl. No.: 16/260,381

(22) Filed: Jan. 29, 2019

(65) Prior Publication Data

US 2020/0242217 A1 Jul. 30, 2020

(51) Int. Cl.
*G06F 21/14* (2013.01)
*G06F 8/41* (2018.01)
*G06F 11/34* (2006.01)

(52) U.S. Cl.
CPC .............. *G06F 21/14* (2013.01); *G06F 8/427* (2013.01); *G06F 8/433* (2013.01); *G06F 11/3457* (2013.01); *G06F 2221/2107* (2013.01)

(58) Field of Classification Search
CPC .......... G06F 21/14; G06F 8/427; G06F 8/433; G06F 11/3457; G06F 2221/2107
USPC .......................................................... 713/194
See application file for complete search history.

(56) References Cited

U.S. PATENT DOCUMENTS

| 2004/0153661 | A1* | 8/2004 | Graunke | G06F 21/14 713/194 |
| 2010/0199354 | A1* | 8/2010 | Eker | G06F 21/14 726/26 |
| 2016/0092871 | A1* | 3/2016 | Gordon | H04W 4/06 705/44 |
| 2020/0151305 | A1* | 5/2020 | Lam | G06F 8/41 |

FOREIGN PATENT DOCUMENTS

WO 2013142983 A1 10/2013

OTHER PUBLICATIONS

International Searching Authority, International Search Report and Written Opinion for PCT Application No. PCT/IB2002/050274 dated Apr. 28, 2020.

* cited by examiner

*Primary Examiner* — Michael S McNally
(74) *Attorney, Agent, or Firm* — Rimon PC; Marc Kaufman

(57) ABSTRACT

Systems, methods, and storage media for obfuscating a computer program by representing the control flow of the computer program as data that is not source code are disclosed. Exemplary implementations may: receive source code of a computer program; parse the source code; extract the control flow of the source code; represent at least a portion of the control flow as a control flow model using a mathematical modeling language; store the control flow model as control flow data that represents the control flow of the program and is not executable code; and remove the at least a portion of the control flow from the source code, to thereby obfuscate the control flow of the source code and render the source code more resistant to tampering.

21 Claims, 11 Drawing Sheets

```
int fibPN(int n, struct PetriNet
*myNet)
{ int next =0; int first =0; int second
=0; int tmp =0;

goto PN;

P1:
first = 0;
second = 1;
if (n--)
   {myNet->Pvalue[2]++;}
else
   {myNet->Pvalue[4]++;}
goto PN;

P3:
    tmp = first+second;
    first = second;
    second = tmp;
        if (n--)
            {myNet->Pvalue[2]++;}
        else
            {myNet->Pvalue[4]++;}
goto PN;

P5:
return first;

PN:
next = executeNet(myNet);
switch (next)
   {
   case 1: goto P1;
           break;

case 3: goto P3;
           break;

case 5: goto P5;
           break;
   } return 0; // Compiler warning if
no return, it cannot find the
flow

SYSTEMS, METHODS, AND STORAGE MEDIA FOR OBFUSCATING A COMPUTER PROGRAM BY REPRESENTING THE CONTROL FLOW OF THE COMPUTER PROGRAM AS DATA

FIELD OF THE DISCLOSURE

The present disclosure relates to systems, methods, and storage media for obfuscating a computer program by representing the control flow of the computer program as data that is not executable code.

BACKGROUND

Computer software is generally written in a high-level language which must be compiled into low-level object code in order to execute on a computer or other processor. High-level computer languages use command wording that closely mirrors plain language, so they can be easily understood by developers. Object-code generally refers to machine-executable code, which is the output of a software compiler that translates source code from human-readable to machine-executable code.

The low-level structure of a software program is usually described in terms of its data flow and control flow. Dataflow is a description of the variables together with the operations performed on the variables. Control-flow is a description of how control jumps from block to block in the program during execution. For example, an If-Then-Else statement includes two operations to be performed on the input and control flow that directs execution to one operation or the other based on a condition variable.

Tampering refers to changing computer software in a manner that is against the wishes of the original author. Traditionally, computer software programs have had limitations encoded into them, such as requiring password access, preventing copying, or allowing the software only to execute a predetermined number of times or for a certain duration. However, because the user often has access to the software code, methods have been found to identify the code administering these limitations. Once this coding has been identified, a sophisticated user is able to overcome these programmed limitations by modifying the software code. Also, it is difficult to prevent users from using tools such as debuggers for monitoring the computer software as it executes. This allows the user to obtain the complete dataflow and control-flow.

Many attempts have been made to prevent attacks by "obfuscating" code e.g., making the organization of the software code more confusing and hence, more difficult to understand and modify. Software is commercially available to "obfuscate" source in code in manners such as:
- globally replacing variable names with random character strings. For example, each occurrence of the variable name "SecurityCode" could be replaced with the character string "1xcd385mxc" so that it is more difficult for an attacker to identify the variables he is looking for;
- deleting comments and other documentation; and
- removing source-level structural indentations, such as the indentation of loop bodies, to make the loops more difficult to read.

Further, it is known to obfuscate the control flow of computer programs. For example, U.S. Pat. No. 5,748,741 describes a method of obfuscating computer software by artificially constructing a "complex wall". This "complex wall" is preferably a "cascade" structure, where each output is dependent on all inputs. The original program is protected by merging it with this cascade, by intertwining the two. The intention is to make it very difficult for the attacker to separate the original program from the complex wall again, which is necessary to alter the original program. This approach has limitations such as a large code expansion. The control flow of a program is one of the most important and readily available assets used to understand what a program is doing.

While conventional obfuscation techniques may attempt to hide the control flow of a program, the control flow statements still exist in the source code where they can be uncovered. Further, the control flow of a program is a fixed asset that cannot change after the program has been deployed. Therefore, known mechanisms for obfuscation of control flow are not always effective.

As noted above, it is desirable to prevent users from making small, meaningful changes to computer programs, such as overriding copy protection and timeouts in demonstration software. It is also necessary to protect computer software against reverse engineering which might be used to identify valuable intellectual property contained within a software algorithm or model. In hardware design, for example, vendors of application specific integrated circuit (ASIC) cell libraries often provide precise software models corresponding to the hardware, so that users can perform accurate system simulations. Because such a disclosure usually provides sufficient detail to reveal the actual cell design, it is desirable to protect the content of the software model.

There is therefore a need for a method and system of making computer software more resistant to tampering and reverse engineering by removing control flow from the executable code without introducing impractical overhead.

SUMMARY

Implementations described herein, remove or hide source code relating to control flow and express the control flow as data that is not source code. This data can be used by an execution engine, at runtime for example, to ascertain the control flow of the program. Because control flow statements in the source code are removed or hidden, it becomes very difficult, virtually impossible, for an attacker to ascertain the control flow from the source code and thus the software is more secure against attack.

Some implementations encode the control flow of the program into a modified Petri Net which is then represented as data that can be applied at runtime to execute the program. Petri Nets are well known models for describing various systems and are described in greater detail below. Implementations described herein include a novel process for encoding the process flow of a computer program into a mathematical model, such as a Petri Net, and a novel process for converting the model into control flow data that is not source code. As the control flow data represents the actual control flow, the control flow statements in the source code can be removed so that the source code of the program itself no longer has any control flow embedded within it.

When the control flow of a program is transformed into control flow data, a form of obfuscation is performed, effectively removing the control flow statements from the program. This makes it much harder for attackers to reverse engineer the code. Because the control flow is transformed into data, many additional obfuscation possibilities can be applied to the control flow data such as transforming or encoding the control flow data using existing encoding techniques (AES for example), or storing the control flow data remotely from the actual program.

When control flow is extracted from a program it can then be dynamically modified. It's no longer a fixed asset that cannot change after the program has been deployed. That modification can happen locally (self-modifying code) or on a server. Programs can be distributed without control flow statements and the control flow data can be received later, at or just before runtime for example, and or through a different channel when required. This will become apparent to one of skill in the art from the description below.

One aspect of the present disclosure relates to a system configured for obfuscating a computer program by representing the control flow of the computer program as data that is not source code. The system may include one or more hardware processors configured by machine-readable instructions. The processor(s) may be configured to receive source code of a computer program. The source code may include a plurality of computing functions of the program and control flow of the program which defines the order in which the computing functions are executed. The processor(s) may be configured to parse the source code. The processor(s) may be configured to extract the control flow of the source code. The processor(s) may be configured to represent at least a portion of the control flow as a control flow model using a mathematical modeling language. The modeling language may include constructs for event elements representing events that occur during execution of the computer program, condition elements which represent conditions that occur during the execution of the computer program and execution elements which are linked to portions of the source code for executing functions. Arcs may be used to link event elements with condition elements and execution elements. Tokens are associated with condition elements and execution elements to represent the state of execution of the computer program. The processor(s) may be configured to store the control flow model as control flow data that represents the control flow of the program and is not executable code. The processor(s) may be configured to remove at least a portion of the control flow from the source code, to thereby obfuscate the control flow of the source code and render the source code more resistant to tampering.

Another aspect of the present disclosure relates to a method for obfuscating a computer program by representing the control flow of the computer program as data that is not source code. The method may include receiving source code of a computer program. The source code may include a plurality of computing functions of the program and control flow of the program which defines the order in which the computing functions are executed. The method may include parsing the source code. The method may include extracting the control flow of the source code. The method may include representing at least a portion of the control flow as a control flow model using a mathematical modeling language. The modeling language may include constructs for event elements representing events that occur during execution of the computer program, condition elements which represent conditions that occur during the execution of the computer program and execution elements which are linked to portions of the source code for executing functions. Arcs may be used to link event elements with condition elements and execution elements. Tokens are associated with condition elements and execution elements to represent the state of execution of the computer program. The method may include storing the control flow model as control flow data that represents the control flow of the program and is not executable code. The method may include removing at least a portion of the control flow from the source code, to thereby obfuscate the control flow of the source code and render the source code more resistant to tampering.

Yet another aspect of the present disclosure relates to a non-transient computer-readable storage medium having instructions embodied thereon, the instructions being executable by one or more processors to perform a method for obfuscating a computer program by representing the control flow of the computer program as data that is not source code. The method may include receiving source code of a computer program. The source code may include a plurality of computing functions of the program and control flow of the program which defines the order in which the computing functions are executed. The method may include parsing the source code. The method may include extracting the control flow of the source code. The method may include representing at least a portion of the control flow as a control flow model using a mathematical modeling language. The modeling language may include constructs for event elements representing events that occur during execution of the computer program, condition elements which represent conditions that occur during the execution of the computer program and execution elements which are linked to portions of the source code for executing functions. Arcs may be used to link event elements with condition elements and execution elements. Tokens are associated with condition elements and execution elements to represent the state of execution of the computer program. The method may include storing the control flow model as control flow data that represents the control flow of the program and is not executable code. The method may include removing at least a portion of the control flow from the source code, to thereby obfuscate the control flow of the source code and render the source code more resistant to tampering.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures of the Drawing. It is to be expressly understood, however, that the figures are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWING

FIG. 8 illustrates an example of source code of a program linked to the execution elements of a Petri Net.

DETAILED DESCRIPTION

Figure 1:
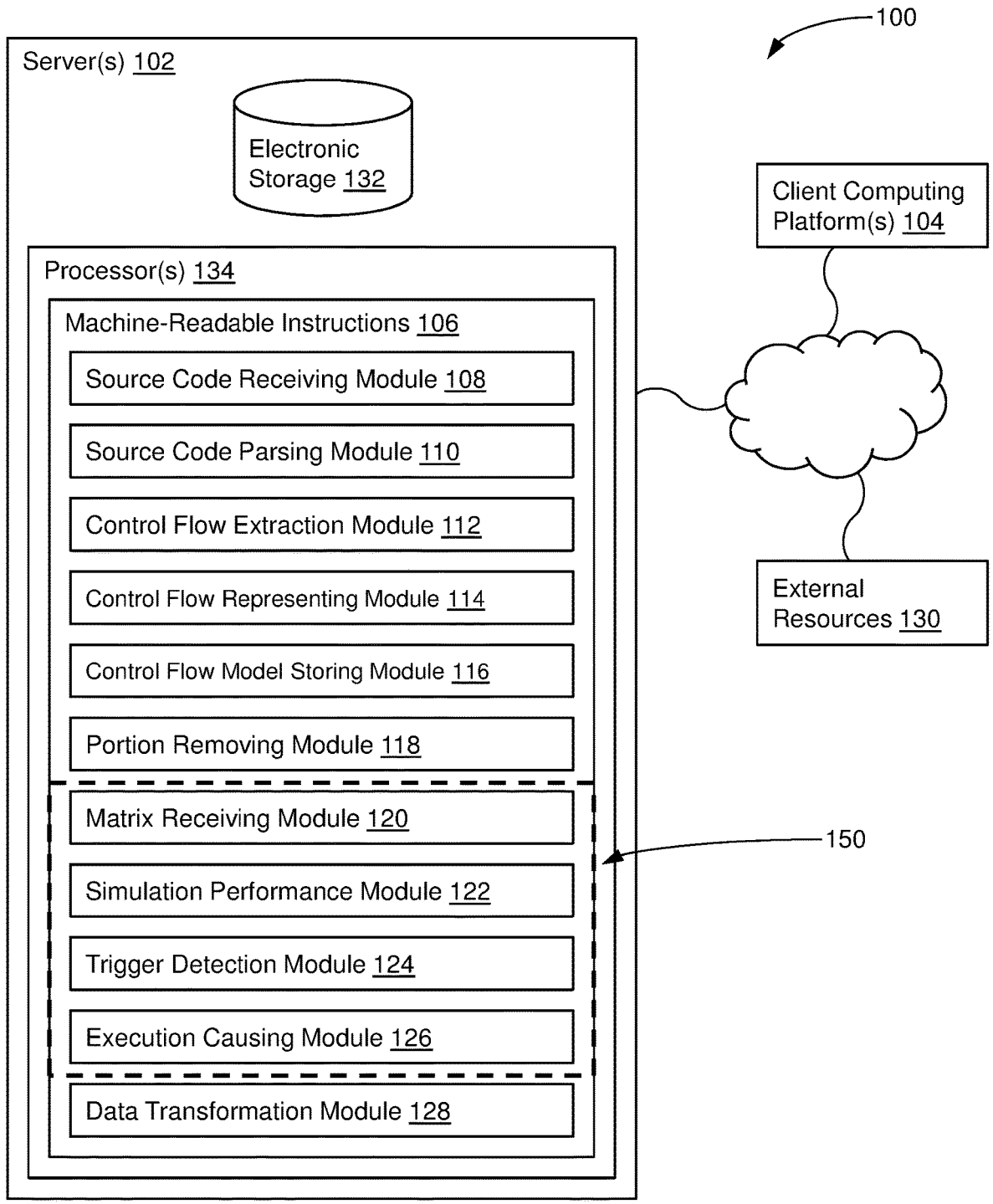
FIG. 1 shows a computer architecture for obfuscating a computer program by representing the control flow of the computer program as data, in accordance with one or more implementations.

Implementations will first be described at a very high level in connection with FIG. 1 and FIG. 2. FIG. 1 illustrates a computer architecture 00 configured for obfuscating a computer program by representing the control flow of the computer program as data that is not source code, in accordance with one or more implementations. In some implementations, architecture 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access server(s) 102 via client computing platform(s) 104.

Server(s) 102 may be configured by machine-readable instructions 106. Machine-readable instructions 106 may include one or more instruction modules stored as executable code, in electronic storage 132 for example. The instruction modules may include computer program modules. The instruction modules may include one or more of a source code receiving module 108, a source code parsing module 110, a control flow extraction module 112, a control flow representing module 114, a control flow model storing module 116, a portion removing module 118, a matrix receiving module 120, a simulation performance module 122, a trigger detection module 124, an execution causing module 126, a data transformation module 128, and/or other instruction modules. Modules 106, 108, 110, 112, 114, 116, and 118 accomplishes the process of obfuscating the program code. Modules 120, 122, 124, and 126 are part of execution engine 150, described in greater detail below, which is operative at runtime of the obfuscated code. While the modules of server(s) 102 can be implemented on various processers distributed in various manners, the modules of execution engine 150 are generally executed at runtime of the obfuscated and will, in some implementations be stored and executed on a processor that is remote from the processor executing the other modules for reasons which become apparent below.

Source code receiving module 108 may be configured to receive source code of a computer program that is to be protected by obfuscating the control flow thereof. The source code can be unprotected or can have previous obfuscations or other protection mechanisms. The source code may include a plurality of computing functions of the program and control flow of the program which defines the order in which the computing functions are executed.

Source code parsing module 110 may be configured to parse the source code in the manner described in greater detail below. Control flow extraction module 112 may be configured to extract the control flow of at least a portion of the source code in the manner described below. For example, as described in detail below templates can be used to recognize the control flow of various known programming constructs such as if-then statements. The templates can be stored in electronic storage 132 or in external resources 130.

Control flow representing module 114 may be configured to represent at least a portion of the control flow as a control flow model using a mathematical modeling language for expressing systems. The mathematical modeling language may be a modified Petri Net. The modeling language may include constructs for event elements representing events that occur during execution of the computer program, condition elements which represent conditions that occur during the execution of the computer program and execution elements which are linked to portions of the source code for executing functions. Arcs may be used to link event elements with condition elements and execution elements. Tokens are associated with condition elements and execution elements to represent the state of execution of the computer program.

Control flow model storing module 116 may be configured to store the control flow model as control flow data that represents the control flow of the program and is not executable code. The control flow data may be stored as one or more matrices. By way of non-limiting example, the one or more matrices may include a matrix indicating inputs and outputs to transition elements, event elements and condition elements to thereby which represent the arcs. The matrices can also include a matrix representing the status of the process at any given time. The control flow data can be stored in electronic storage 132 or in external resources 130.

Portion removing module 118 may be configured to remove the at least a portion of the control flow represented by the control flow data from the source code, to thereby obfuscate the control flow of the source code and render the source code more resistant to tampering.

As part of execution engine 150, matrix receiving module 120 may be configured to receive the one or more matrices and/or any other control flow data stored by control flow model storing module. The matrices and/or other control flow data may be received by execution engine 150 at or before runtime of the computer program.

Simulation performance module 122 may be a portion of execution engine 150 configured to perform a simulation of the control flow model, i.e. to execute the control flow represented by the model, based on the matrices and/or other control flow data. Performing a simulation of the control flow model based on the matrices may include determining inputs and outputs of each transition in the model and the association of tokens with condition elements and execution elements at each of the one or more times based on the matrices.

Trigger detection module 124 may part of execution engine 150 configured to detect a trigger of a specific execution element based on the association of the tokens with execution elements. Execution causing module 126 may be configured to cause execution of portions of the source code linked to the specific execution element.

Data transformation module 128 may be configured to transform the data in the one or more matrices prior to execution to further obfuscate the control flow of the program. Of course, execution engine 150 can have a module to reverse the transformation prior to execution, such as at runtime.

Figure 2:
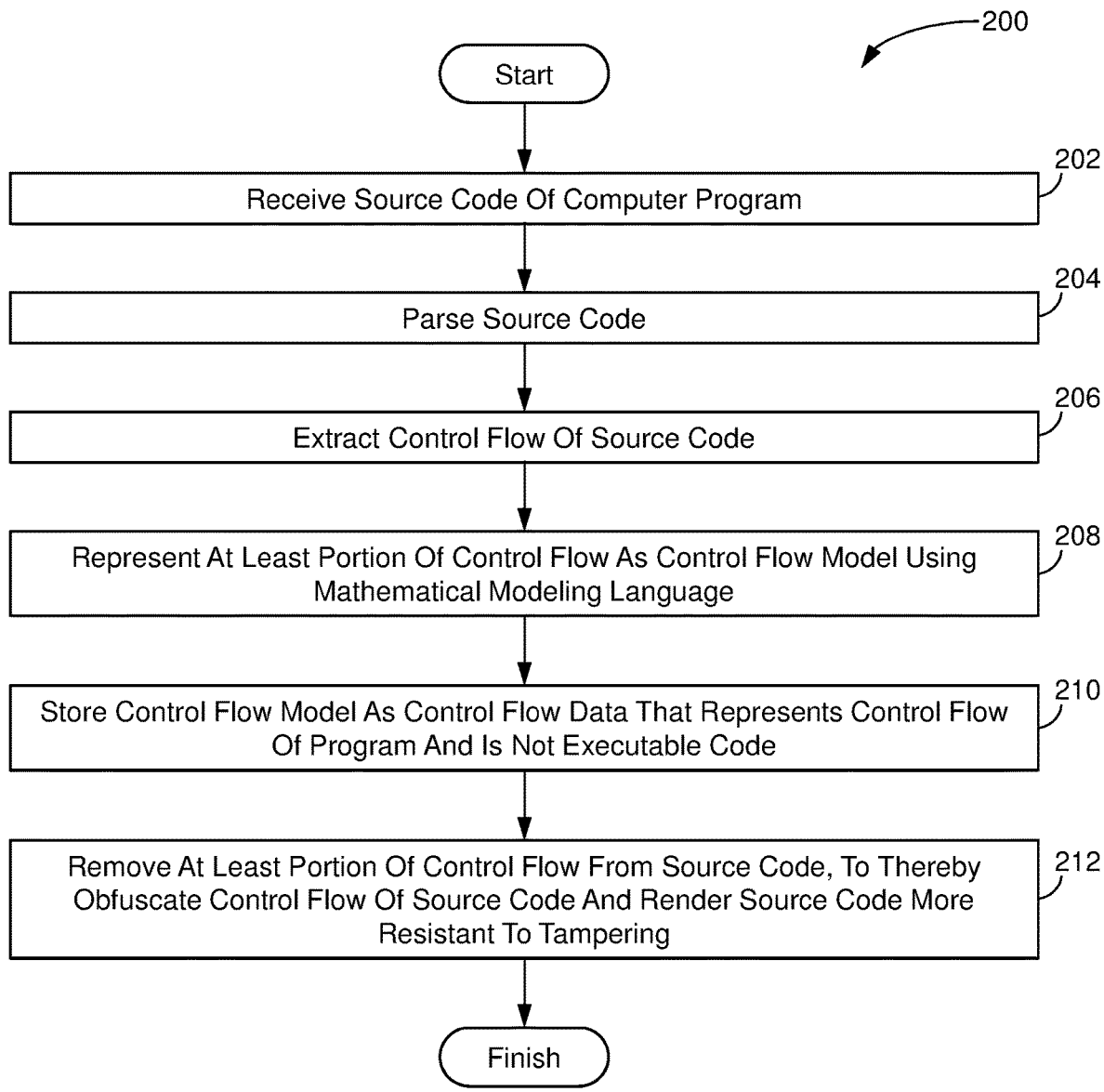
FIG. 2 is a flow chart of a method for obfuscating a computer program by representing the control flow of the computer program as data, in accordance with one or more implementations.

FIG. 2 illustrates a method 200 for obfuscating a computer program by representing the control flow of the computer program as data that is not source code, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices of server(s) 102 (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving source code of a computer program. The source code may include a plurality of computing functions of the program and control flow of the program which defines the order in which the computing functions are executed. Operation 202 may be performed by one or more hardware processors configured by machine-readable instructions including a module that is the same as or similar to source code receiving module 108, in accordance with one or more implementations.

An operation 204 may include parsing the source code. Operation 204 may be performed by one or more hardware processors configured by machine-readable instructions including a module that is the same as or similar to source code parsing module 110, in accordance with one or more implementations.

An operation 206 may include extracting the control flow of the source code. Operation 206 may be performed by one or more hardware processors configured by machine-readable instructions including a module that is the same as or similar to control flow extraction module 112, in accordance with one or more implementations.

An operation 208 may include representing at least a portion of the control flow as a control flow model using a mathematical modeling language. The modeling language may include constructs for event elements representing events that occur during execution of the computer program, condition elements which represent conditions that occur during the execution of the computer program and execution elements which are linked to portions of the source code for executing functions. Arcs may be used to link event elements with condition elements and execution elements and tokens are associated with condition elements and execution elements to represent the state of execution of the computer program. Operation 208 may be performed by one or more hardware processors configured by machine-readable instructions including a module that is the same as or similar to control flow representing module 114, in accordance with one or more implementations.

An operation 210 may include storing the control flow model as control flow data that represents the control flow of the program and is not executable code. Operation 210 may be performed by one or more hardware processors configured by machine-readable instructions including a module that is the same as or similar to control flow model storing module 116, in accordance with one or more implementations.

An operation 212 may include removing the at least a portion of the control flow from the source code, to thereby obfuscate the control flow of the source code and render the source code more resistant to tampering. Operation 212 may be performed by one or more hardware processors configured by machine-readable instructions including a module that is the same as or similar to portion removing module 118, in accordance with one or more implementations.

Figure 3:
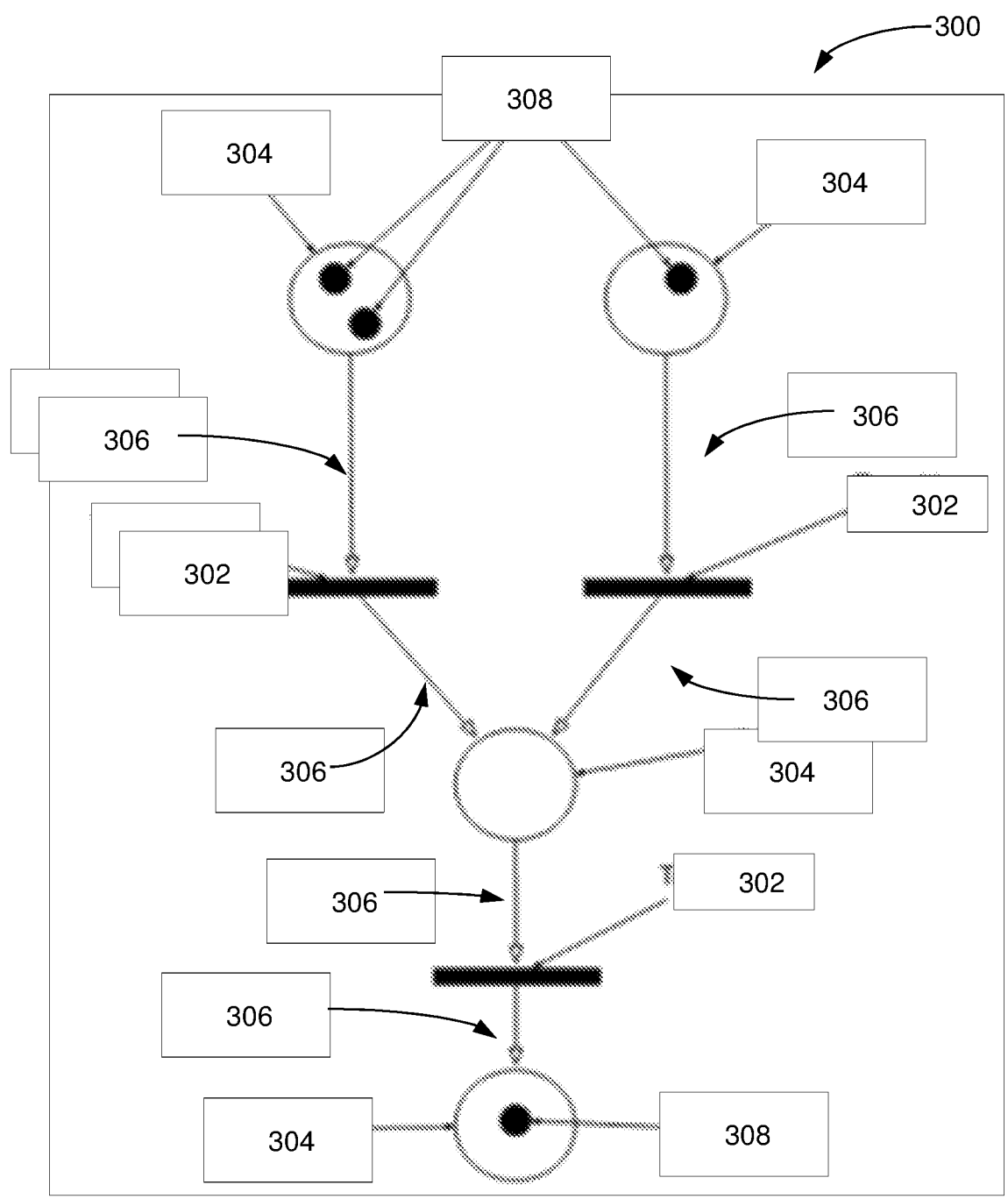
FIG. 3 illustrates an example of a conventional Petri Net.

Before describing a specific example, some background on Petri Nets is provided. FIG. 3 illustrates a relatively simple example of a conventional Petri Net diagram. A Petri net, also known as a place/transition (PT) net, is a mathematical modeling language, and graphical representation, for describing systems. As illustrated in FIG. 3, Petri Net diagram 300 includes nodes 302 (referred to as "transition elements" herein) representing transitions of a process flow (i.e. events that may occur in the process) and are represented physically by bars. "Places" 302 of a Petri Net (referred to as "condition elements" herein) represent conditions of the process flow and are represented physically by circles. "Arcs" 306 represent which places (conditions) are pre- and/or postconditions for which transitions. Arcs 306 are represented physically by arrows.

Arcs 306 run from a condition element 304 to a transition element 302 or vice versa. Arcs never run between condition elements 304 or between transition elements 302. The condition elements 304 from which an arc runs to a transition element 302 are called the input condition elements of the transition. The condition elements to which arcs run from a transition element are called the output condition elements of the transition element.

Graphically, condition elements 304 may contain a discrete number of marks 308 called "tokens." Any distribution of tokens 308 over condition elements 304 will represent a configuration of the Petri Net called a marking. In an abstract sense relating to a Petri net diagram, a transition element of a Petri Net may fire if it is enabled, i.e. there are sufficient tokens in all of its input condition elements. When the transition fires, it consumes the required input tokens, and creates tokens in the output places of the transition. A firing is atomic, i.e. a single non-interruptible step. The firing rule for a transition can be characterized by subtracting a number of tokens from its input places equal to the multiplicity of the respective input arcs and accumulating a new number of tokens at the output places equal to the multiplicity of the respective output arcs. The flow of tokens 308 and firing of transitions can be configured to model various systems.

Implementations disclosed herein include a novel extension to conventional Petri Nets. The extension referred to herein as an "execution place" or "execution element." An execution element has executable code associated therewith, through linking or another mechanism, and triggers an execution of the associated code when the execution elements is fired. Execution places are represented physically herein with a square. When a token reaches an execution element in a Petri Net, the Petri Net execution stops and the code associated with the execution element is executed in an atomic manner. When the code execution completes, the process can return to execution of the Petri Net. Therefore, the Petri Net can be used to determine the flow of the code, i.e. the next block of code to be executed. This allows further integration between the code and the Petri Net that represents the control flow of the code. Note the executable code can include instructions to add tokens from elements, or otherwise detect and modify the number of tokens in elements, in the Petri Net. For example, and AddToken can be used so that the state of the running program can influence the flow of the program. In a sense it's the only "if" needed to execute a model. AddToken can be used to change a decision of the control flow based on the state of the running program.

The executable code associated with an execution element can be C code or any other suitable code that can be executed directly or indirectly by a computer processor. For example, the code can be any code that can indicate an action to be executed by a computer processor. Various mechanisms can be used to associate the code with and execution place.

Figure 4:
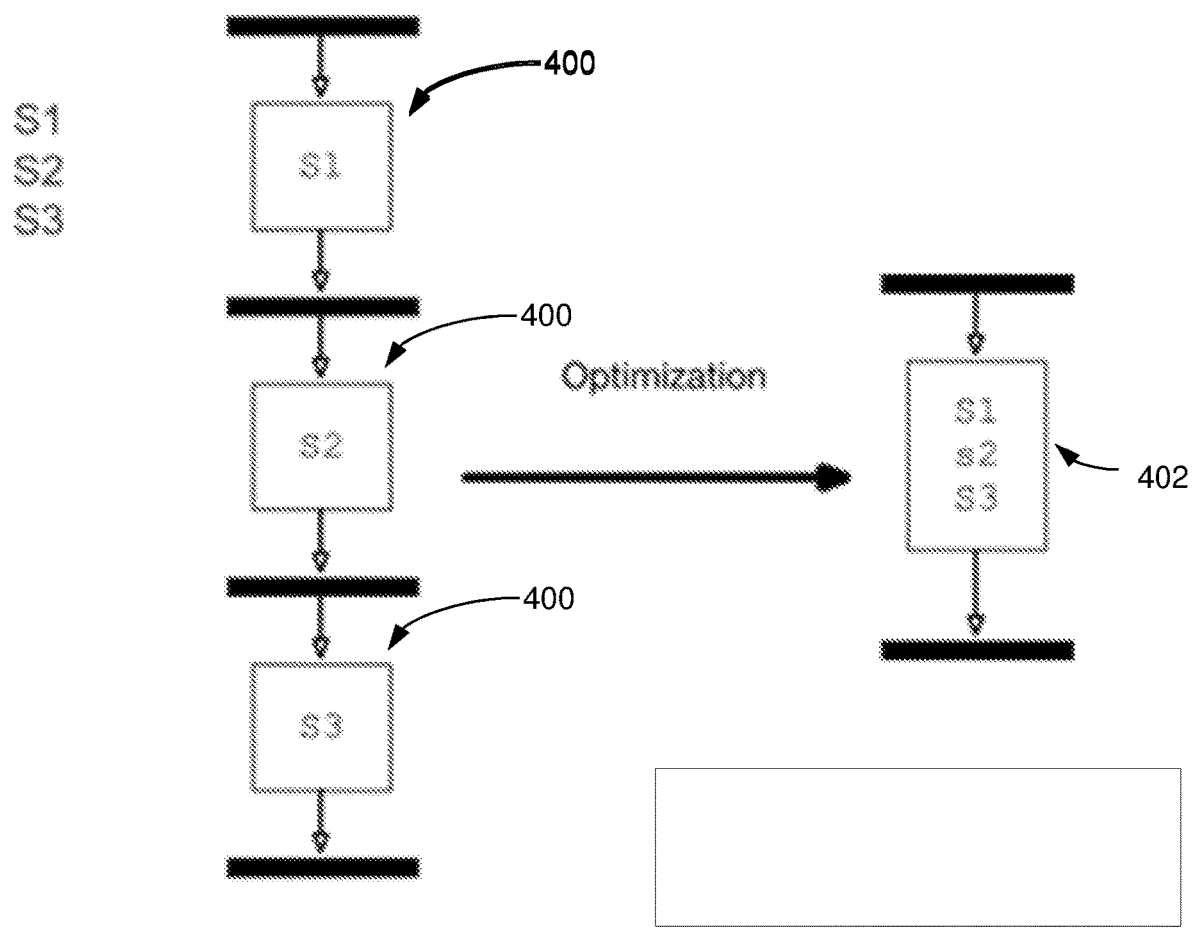
FIG. 4 is a high level block diagram showing control flow statements extracted from source code and embedded in a Petri Net.

As noted above, conventional source code is received and processed to remove or hide control flow of the source code and to represent the control flow in a Petri Net. FIG. 4 illustrates this at a very high level. The source code is parsed (as described in greater detail below) to identify control flow statements (S1, S2, and S3 in this example) and the control flow statements are associated with execution elements 400 of a properly configured Petri Net (also described in greater detail below). Multiple control flow statements can be optimized and collapsed into a single execution element 402.

Figure 5A:
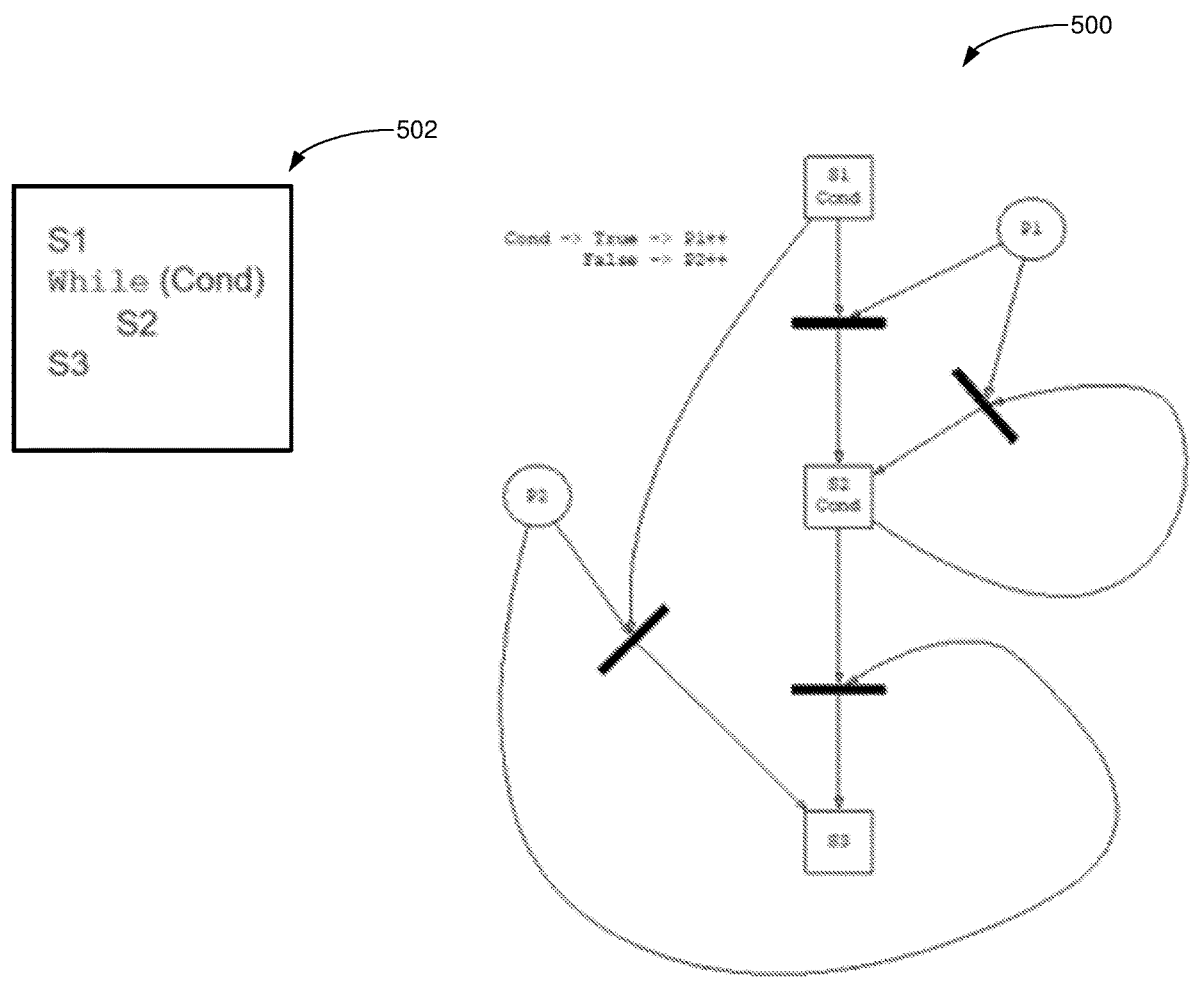
FIG. 5a shows an example of a template for mapping a While statement to a Petri Net.

FIG. 5a illustrates the parsing of code, extraction of control flow statements, and representation as a Petri Net in more detail. The example of FIG. 5 is a common do while loop statement based on code 502. A do while loop is a control flow statement that executes a block of code at least once, and then repeatedly executes the block, or not, depending on a given condition. The do while construct consists of a process symbol and a condition. First, the code within the block is executed, and then the condition is evaluated. If the condition is true the code within the block is executed again. This repeats until the condition becomes false. As shown in the example of FIG. 5, the statement S1 is executed while condition Cond is true. When condition Cond is no longer true, statement S1 terminates and control flow continues to statements S2 and S3. As shown in FIG. 5 a Petri Net 500 has been constructed with statements S1, S2, and S3 in execution elements and condition elements P1 and P2. Condition element P1 corresponds to Cond=True and condition element P2 corresponds to Cond=False. This flow of the Petri Net can be articulated as the following steps"

1. a token is added to "S1" as this is the start of the PN;
2. As a token is added to S1, because it is an execution block, the code of S1 will execute;
3. the "cond" will be set according to the rule (true will add a token at P1 and false will add a token at P2);
4. depending on where the token has been added, transitions that have P2 as an input S1 and P1 or S2 and P2 could be triggered;
5. if S1-P1 have a token the transition will be triggered, removing a token from S1 and P1 and adding a token to S2;
6. S2 is an execution block and will execute the code of S2 and the cond that will place another token at P1 or S2.

Figure 5B:
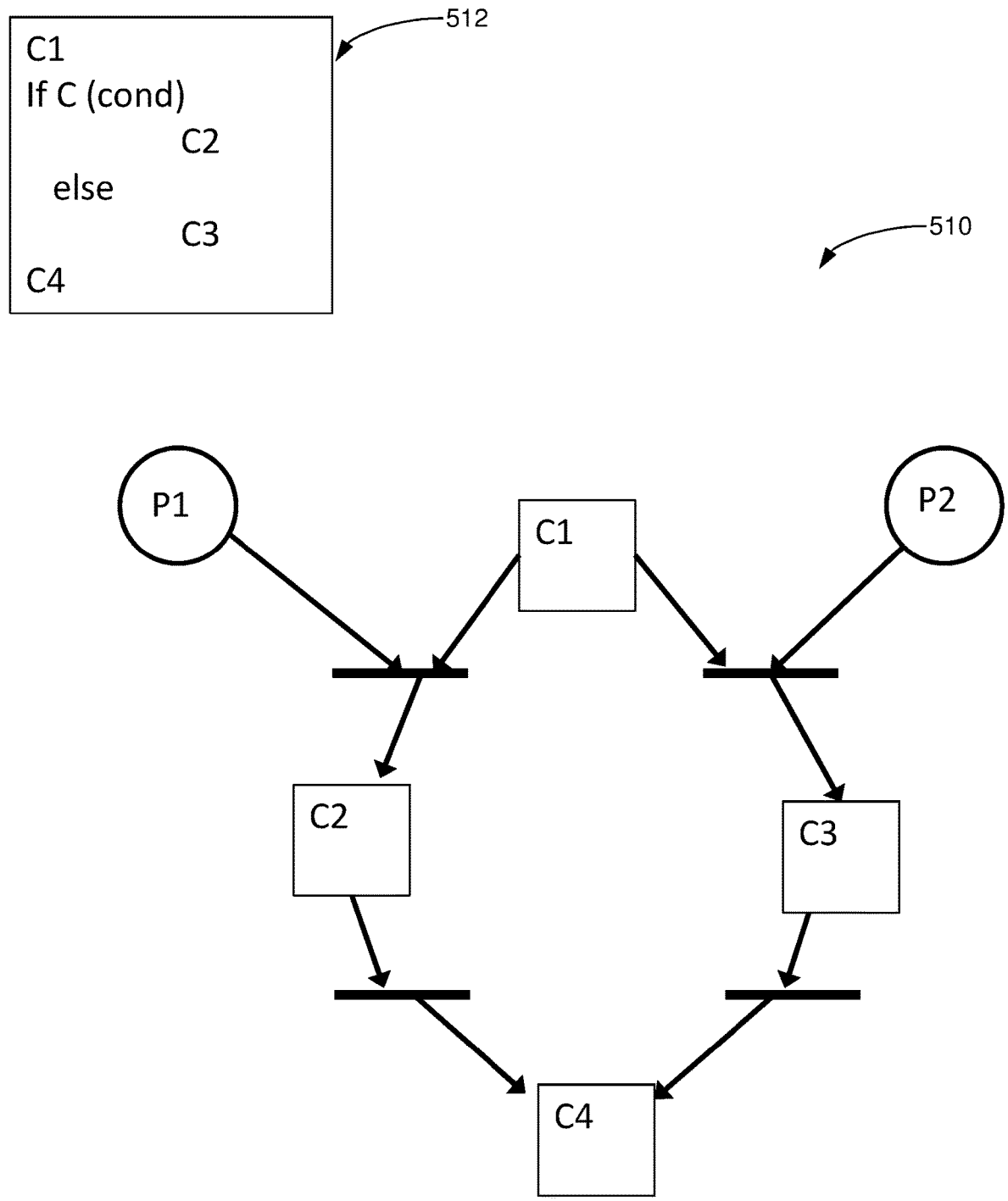
FIG. 5b shows an example of a template for mapping an IF-Then-Else statement to a Petri Net.
Figure 5C:
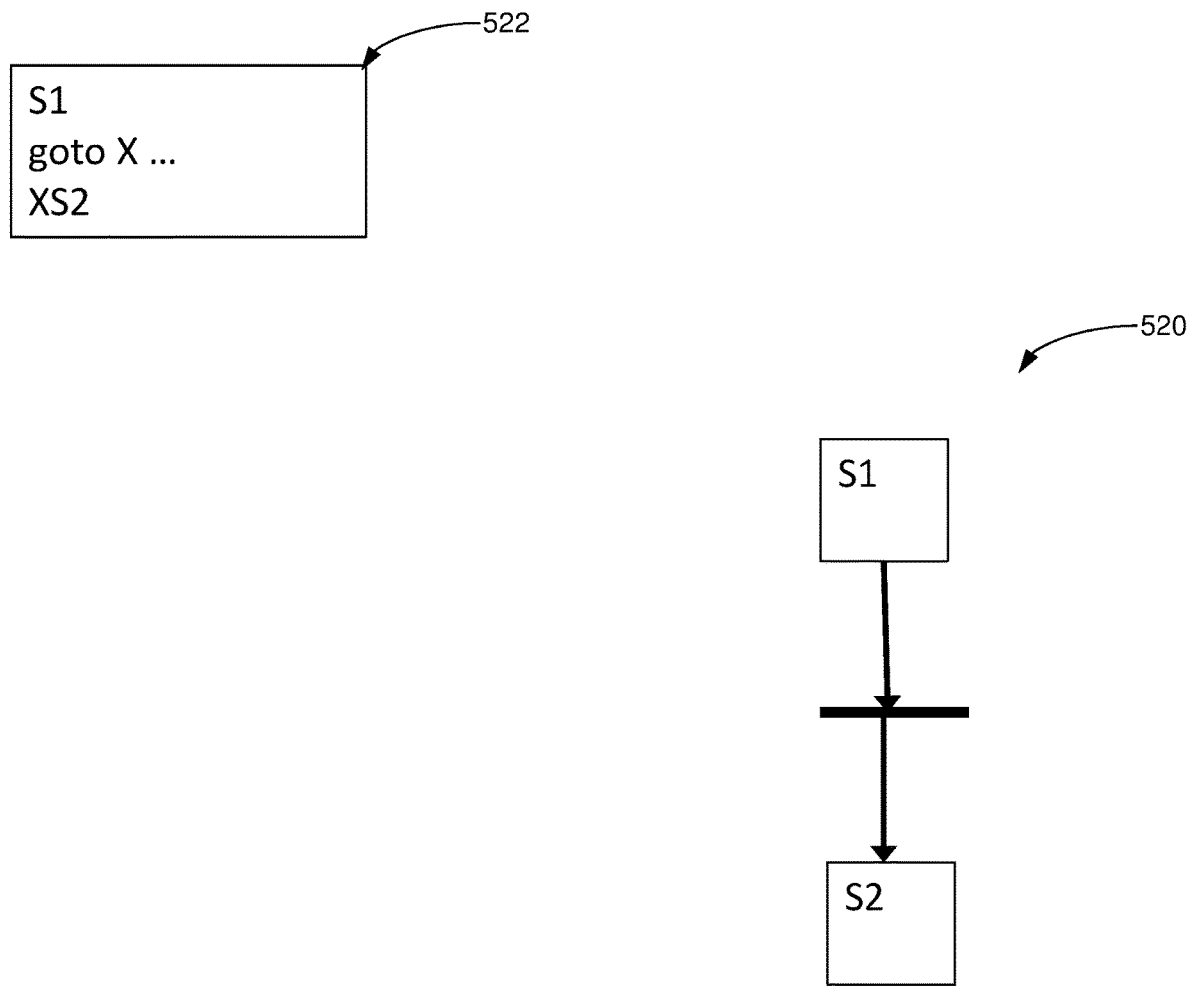
FIG. 5c shows an example of a template for mapping a goto statement to a Petri Net.
Figure 5D:
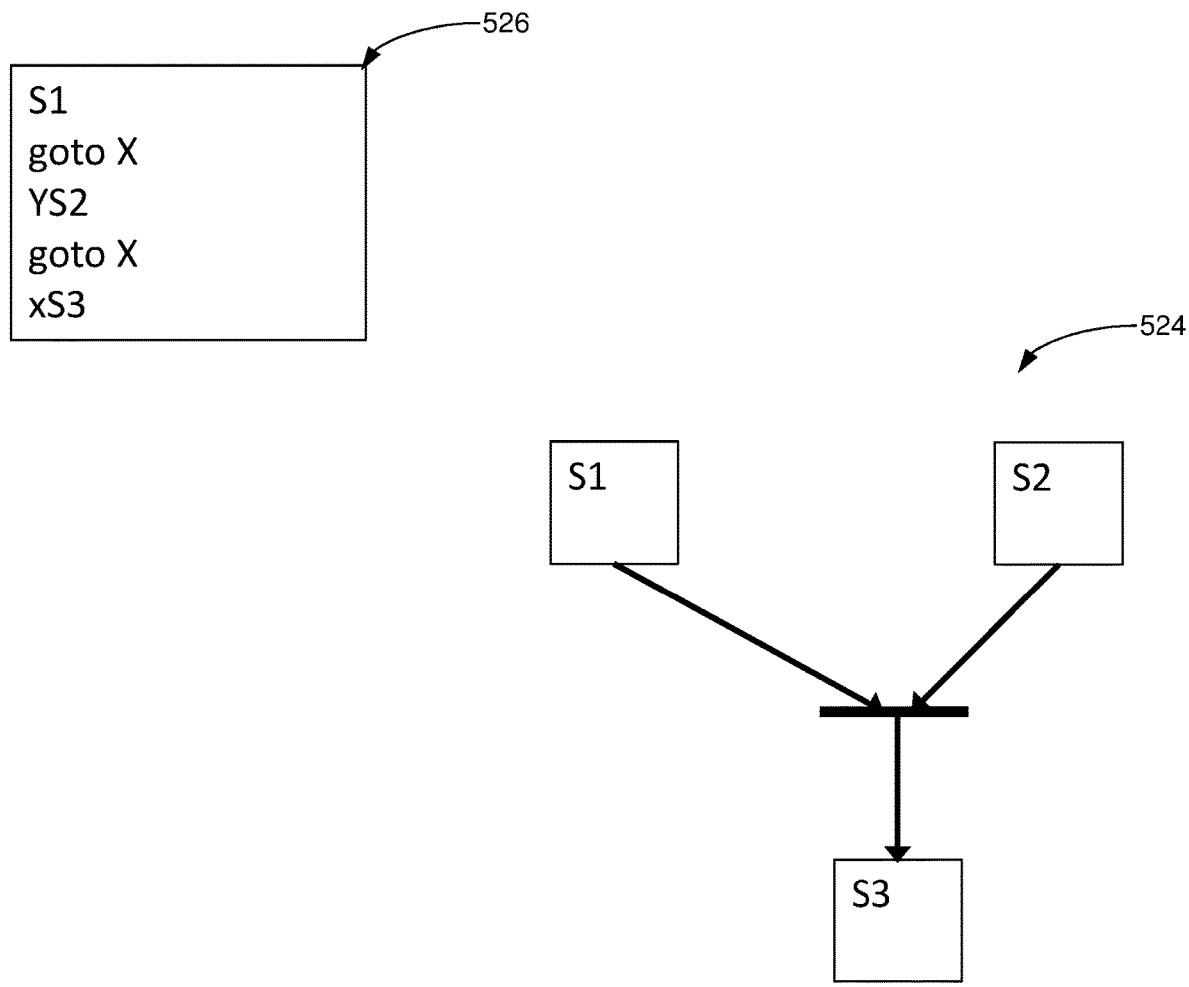
FIG. 5d shows another example of a template for mapping a goto statement to a Petri Net.

FIG. 5b. illustrates a template that can be used for parsing If then else statement code 512 and the corresponding Petri Net 510. FIG. 5c illustrates a template that can be used for parsing goto statement code 522 to create Petri Net 520. S2 is, is a sense, the X block of code. FIG. 5d illustrates another template of code 526 linked to Petri Net 524. IN this template, X and Y are the goto labels. S2 represents the Y block of code and S3 represents the X block. Various templates can have common combinations of logic flow and corresponding predefined Petri Net configurations. The templates can be stored in a database, in external resources 130 for example. Corresponding code portions can be recognized based on parsing of code in a known manner. For example, tools such as pycparser can be used to parse the code. The parsed conditions and statements can be mapped to the elements of the corresponding Petri Net in accordance with mappings provided in the template. Of course, the code of a single application might be mapped to multiple Petri Nets.

FIG. 5b. illustrates a template that can be used for parsing If then else statement code 512 and the corresponding Petri Net 510. FIG. 5c illustrates a template that can be used for parsing goto statement code 522 to create Petri Net 520. S2 is, is a sense, the X block of code. FIG. 5d illustrates another template of code 526 linked to Petri Net 524. IN this template, X and Y are the goto labels. S2 represents the Y block of code and S3 represents the X block. Various templates can have common combinations of logic flow and corresponding predefined Petri Net configurations. The templates can be stored in a database, in external resources 130 for example. Corresponding code portions can be recognized based on parsing of code in a known manner. For example, tools such as pycparser can be used to parse the code. The parsed conditions and statements can be mapped to the elements of the corresponding Petri Net in accordance with mappings provided in the template. Of course, the code of a single application might be mapped to multiple Petri Nets.

Figure 6:
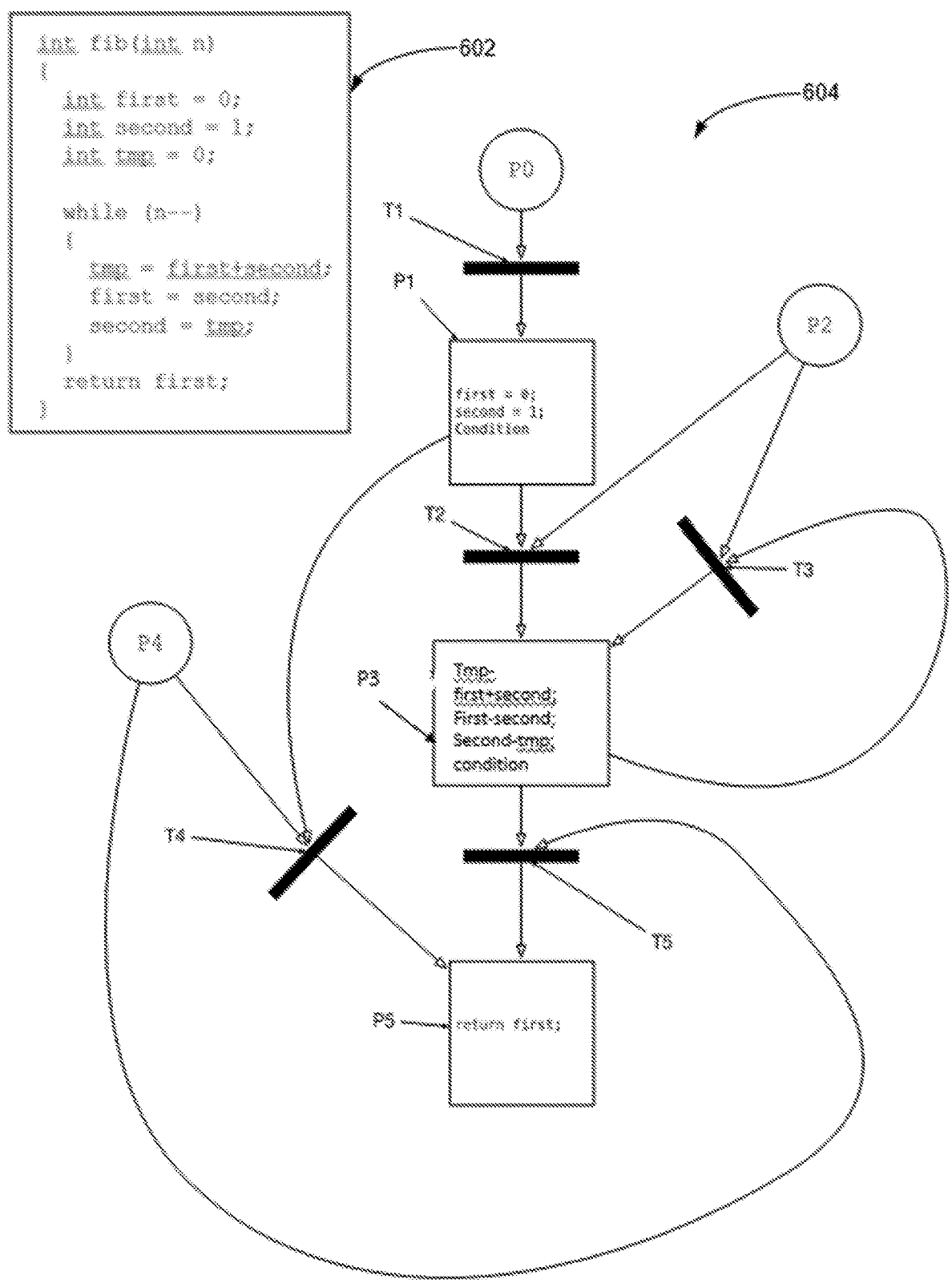
FIG. 6 shows an example of specific code being mapped to a Petri Net.

FIG. 6 illustrates a more specific example of code parsing and Petri Net creation. The code that is received by the example of FIG. 6 is a program written to accomplish an iterative Fibonacci sequence, a common calculation with many pragmatic applications. The C code is listed at 602. The C code 602 can be parsed and control flow statements can be identified and extracted, based on known patterns matching a template for example. A Petri Net 604 can then be created to match the extracted control flow. For example, known control flows, such as do while can be mapped to equivalent Petri Net template configurations in a database, and the appropriate code can be inserted into the execution elements of the template Petri Net.

In Petri Net 604, P0 is the starting condition element, P2 and P4 are "guard" condition elements. P1, P3, and P5 are execution elements having executable code associated therewith (as indicated in the rectangular boxes of Petri Net 604). T1, T2, T3, T4 and T5 are transition elements of Petri Net 604. At the start of execution, one token is at P0. Depending on the condition either a token will be generated in P2 or P4 when the Petri Net is executed by execution engine as described below.

In Petri Net 604, P0 is the "start" place (or "element"). The flow begins by placing a token at P0. Then execution engine 150 executes the flow "algorithm" on the Petri Net 604. The only transition that could be triggered is T1. Because a Petri Net is non-deterministic, any transition that can be triggered is triggered. After T1 is triggered, the token in P0 is removed and a token in P1 is created. As P1 is an execution element, the code that is associate with P1 will be executed. That code has a condition that could place a token in P2 or P4. Let's assume that the token is in P2. Petri Net 604 now has 2 tokens, one in P1 and one in P2. In this state, only T2 can be triggered (T2 has two inputs, P1 and P2). T3 has one if it's input elements with a token but there is no token at P3, which is an input of T3. So T2 will trigger and thee token in P1 and the token in P2 will be removed and a token will be added in P3. As P3 is an execution element, the code associated with P3 will be executed. That code also has a condition that could put a token in P2 or P4. Let's assume it is P2 again. Now there will be a token at P2 and a token at P3. The only transition that could be triggered is T3. T2 cannot trigger as there is no token in P1 and T5 cannot trigger as there is no token in P4. To trigger T3 the token in P2 is removed and the token in P3 is removed and a token is added in P3. As this is an execution element the associated code is executed, which will put a token in P2 or P4. This is a "loop" so we will assume that a token is added in P4. In this state, there is a token in P4 and a token in P3 and the only transition that can trigger is T5. T3 cannot as there is no token in P2 and T4 cannot, as there is no token in P1. Triggering T5 removes the token in P3 and P4 and add a token in P5 and the code associated with T5 is executed. In this state, there is still a token at P5 and no other tokens and thus the Petri Net algorithm will terminate as there is no longer any transition that could be triggered.

Figure 7:
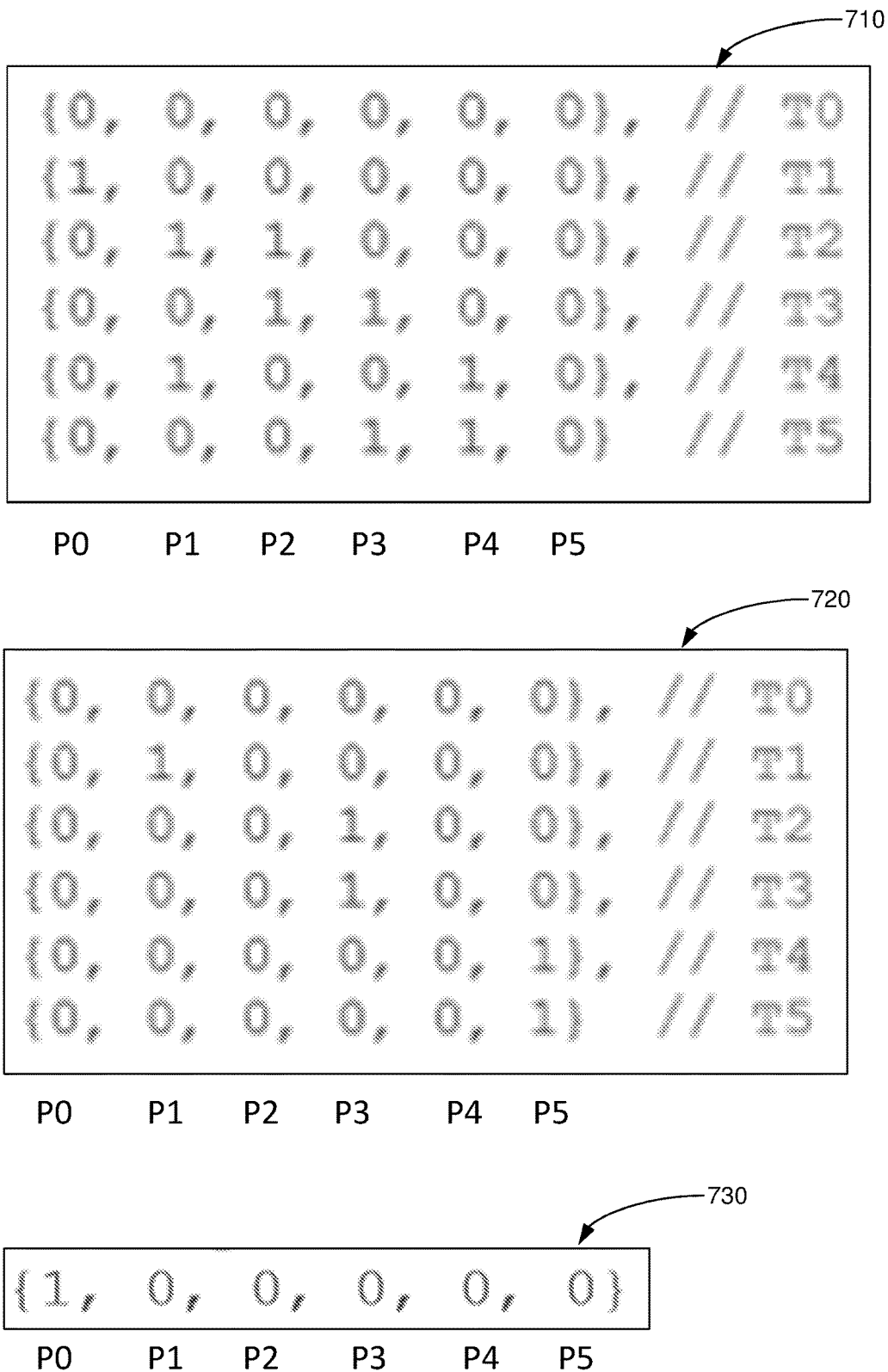
FIG. 7 shows control flow data of the Petri Net of FIG. 6 as arrays.

Petri Net 604 of FIG. 6 can be represented by control flow data that can be stored on computer readable media. Preferably the control flow data is not executable code to facilitate further obfuscation or the like of the control flow data. In this example, the control flow data is converted to a set of matrices. FIG. 7 is an example of control flow data for the Petri Net of FIG. 6. In the example of FIG. 7, the control flow data is stored as 3 Matrices. Matrix 710 represents inputs of each transition element of Petri Net 604 of FIG. 6. Along the x axis of matrix 710 is each of the condition elements and execution elements P0 ... P5. Along the y axis of matrix 710 are each of the transition elements T0 ... T5, where T0 is an unused transition. For example, examining the second row of matrix 710, it can be seen that transition T1 has a single input of P0, indicated by a 1 in the first column. The other columns, being 0, indicate that the other elements are not inputs to transition T1. The inputs of all other transitions in Petri Net 604 are indicated in a similar manner ("1" for a connection and "0" for no connection) in corresponding rows of Matrix 710. Matrix 720 of FIG. 7 records the outputs of each transition in a similar manner. Matrix 730 is dynamic matrix that records the number of tokens at each element P0 ... P5. This matrix is updated over time by execution engine 150 as described below.

FIG. 8 shows how the code of a program can be linked to the execution elements of a Petri Net in accordance with the implementations. As shown in FIG. 8, the control flow has been removed from the program and replaces by the "switch" statement and the "excuteNet( )" function call that compute the next execution element to run. This is only one example of the set of possible implementations. The "executeNet( ) function, and the matrix works together to set how the control flow is represented and executed.

In addition to the functions disclosed above, execution engine 150 will receive the control flow data and return the next set of linked code to be executed. Execution Engine 150 will loop around the transitions of the Petri Net to see which one(s) need to fire, will fire the first one encountered, and will update the token data (such as the columns in matrix 730 of FIG. 7). If a Token arrives in an execution element to execute, execution engine 150 will return an ID of that element, otherwise it will loop around to fire the next transition. An execution routine of execution engine 150 can be linked to the executable code in a manner similar to a Java Virtual Machine (JVM). Only one copy of the execution routine of execution engine 150 is needed to execute any Petri Net, i.e., only one copy is needed for all programs with extracted control flow. Therefore, the implementations have very little "code bloat" and are very efficient.

One example of an algorithm for Execution Engine 150 is shown below:
Scan the input array (710 in FIG. 7) corresponding to a transition;
if there is a 1 for an element, i.e. the element is an input to the transition, then look at the token array (730 in FIG. 7) to see if there is a token at the element;
repeat for each element;
if there is a token at each input corresponding to the transition, then trigger the transition;
for each input to the transition remove the token corresponding to the input from the token array (730 in FIG. 7);
for each element in the output array (720 in FIG. 7) set the value of the token in the token array to 1;
if a P is an execution element, then execute the associated code, reduce by 1 the token in input place and increase by 1 the token in output place;
loop around and repeat until no transition can be fired (The "order" of checking for which transition to "fire" can be top-bottom, button top, random).

In some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program modules. The computer program modules may be configured to enable a user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. For example, client computing platform(s) 104 can be associated with parties providing software code that is to be processed by server 102 for increased security.

External resources 130 may include sources of information outside of system 100, external entities participating with system 100, and/or other resources. For example, external resources can include remote storage for templates that are disclosed herein or remote storage for the control flow data. In some implementations, some or all of the functionality attributed herein to server 102 may be provided by resources included in external resources 130.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute modules 108, 110, 112, 114, 116, 118, 120, 122, 124, 126, and/or 128, and/or other modules. Processor(s) 134 may be configured to execute modules 108, 110, 112, 114, 116, 118, 120, 122, 124, 126, and/or 128, and/or other modules by software; hardware; firmware; some combination of software, hardware, and/or firmware; and/or other mechanisms for configuring processing capabilities on processor(s) 134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, and/or 128 are illustrated in FIG. 1 as being implemented within a single processing unit, in implementations in which processor(s) 134 includes multiple processing units, one or more of modules 108, 110, 112, 114, 116, 118, 120, 122, 124, 126, and/or 128 may be implemented remotely from the other modules. The description of the functionality provided by the different modules 108, 110, 112, 114, 116, 118, 120, 122, 124, 126, and/or 128 described below is for illustrative purposes, and is not intended to be limiting, as any of modules 108, 110, 112, 114, 116, 118, 120, 122, 124, 126, and/or 128 may provide more or less functionality than is described. For example, one or more of modules 108, 110, 112, 114, 116, 118, 120, 122, 124, 126, and/or 128 may be eliminated, and some or all of its functionality may be provided by other ones of modules 108, 110, 112, 114, 116, 118, 120, 122, 124, 126, and/or 128. As another example, processor(s) 134 may be configured to execute one or more additional modules that may perform some or all of the functionality attributed below to one of modules 108, 110, 112, 114, 116, 118, 120, 122, 124, 126, and/or 128.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for obfuscating a computer program by representing the control flow of the computer program as control flow data that is not source code, the system comprising:
    one or more hardware processors configured by machine-readable instructions to:
        receive source code of a computer program, the source code including a plurality of computing functions of the program and control flow of the program which defines the order in which the computing functions are executed;
        parse the source code;
        extract at least a part of the control flow of the source code;
        represent at least a portion of the control flow as a control flow model using a mathematical modeling language, the modeling language including constructs for event elements representing events that occur during execution of the computer program, condition elements which represent conditions that occur during the execution of the computer program and execution elements which are linked to portions of the source code for executing functions, wherein arcs are used to link event elements with condition elements and execution elements and wherein tokens are associated with condition elements and execution elements to represent the state of execution of the computer program;
        store the control flow model as control flow data that represents the control flow of the program wherein the control flow data is not executable code; and
        remove the at least a portion of the control flow from the source code, to thereby obfuscate the control flow of the source code and render the source code more resistant to tampering.

2. The system of claim 1, wherein the control flow data is stored as one or more matrices.

3. The system of claim 2, wherein the one or more matrices comprise at least one matrix indicating inputs to and outputs of transition elements, event elements and condition elements to thereby represent the structure of the control flow model.

4. The system of claim 2, wherein the one or more matrices comprise a matrix indicating the association of tokens with the condition elements and the execution elements at one or more times during execution of the computer program.

5. The system of claim 2, wherein the mathematical modeling language is a modified Petri Net.

6. The system of claim 5, wherein the one or more hardware processors are further configured by machine-readable instructions to:
receive, by an execution engine, the one or more matrices;
perform, by the execution engine, a simulation of the control flow model based on the matrices;
detect, by the execution engine a trigger of a specific execution element based on the association of the tokens with execution elements;
cause execution of portions of the source code linked to the specific execution element.

7. The system of claim 6, wherein performing a simulation of the control flow model based on the matrices comprises determining the association of tokens with condition elements and execution elements at each of the one or more times based on the matrices.

8. A method of obfuscating a computer program by representing the control flow of the computer program as data that is not source code, the method comprising:
receiving source code of a computer program, the source code including a plurality of computing functions of the program and control flow of the program which defines the order in which the computing functions are executed;
parsing the source code;
extracting at least a part of the control flow of the source code;
representing at least a portion of the control flow as a control flow model using a mathematical modeling language, the modeling language including constructs for event elements representing events that occur during execution of the computer program, condition elements which represent conditions that occur during the execution of the computer program and execution elements which are linked to portions of the source code for executing functions, wherein arcs are used to link event elements with condition elements and execution elements and wherein tokens are associated with condition elements and execution elements to represent the state of execution of the computer program;
storing the control flow model as control flow data that represents the control flow of the program, wherein the control flow data is not executable code; and
removing the at least a portion of the control flow from the source code, to thereby obfuscate the control flow of the source code and render the source code more resistant to tampering.

9. The method of claim 8, wherein the control flow data is stored as one or more matrices.

10. The method of claim 9, wherein the one or more matrices comprise a matrix indicating inputs to transition elements, event elements and condition elements to thereby represent the structure of the control flow model.

11. The method of claim 9, wherein the one or more matrices comprise a matrix indicating the association of tokens with the condition elements and the execution elements at one or more times during execution of the computer program.

12. The method of claim 9, wherein the mathematical modeling language is a modified Petri Net.

13. The method of claim 12, further comprising:
receiving, by an execution engine, the one or more matrices;
performing, by the execution engine, a simulation of the control flow model based on the matrices;
detecting, by the execution engine a trigger of a specific execution element based on the association of the tokens with execution elements; and
causing execution of portions of the source code linked to the specific execution element.

14. The method of claim 13, wherein performing a simulation of the control flow model based on the matrices comprises determining the association of tokens with condition elements and execution elements at each of the one or more times based on the matrices.

15. A non-transient computer-readable storage medium having instructions embodied thereon, the instructions being executable by one or more processors to perform a method for obfuscating a computer program by representing the control flow of the computer program as data that is not source code, the method comprising:
receiving source code of a computer program, the source code including a plurality of computing functions of the program and control flow of the program which defines the order in which the computing functions are executed;
parsing the source code;
extracting at least a part of the control flow of the source code;
representing at least a portion of the control flow as a control flow model using a mathematical modeling language, the modeling language including constructs for event elements representing events that occur during execution of the computer program, condition elements which represent conditions that occur during the execution of the computer program and execution elements which are linked to portions of the source code for executing functions, wherein arcs are used to link event elements with condition elements and execution elements and wherein tokens are associated with condition elements and execution elements to represent the state of execution of the computer program;
storing the control flow model as control flow data that represents the control flow of the program and is not executable code; and
removing the at least a portion of the control flow from the source code, to thereby obfuscate the control flow of the source code and render the source code more resistant to tampering.

16. The computer-readable storage medium of claim 15, wherein the control flow data is stored as one or more matrices.

17. The computer-readable storage medium of claim 16, wherein the one or more matrices comprise a matrix indicating inputs to transition elements, event elements and condition elements to thereby represent the structure of the control flow model.

18. The computer-readable storage medium of claim 16, wherein the one or more matrices comprise a matrix indicating the association of tokens with the condition elements and the execution elements at one or more times during execution of the computer program.

19. The computer-readable storage medium of claim 16, wherein the mathematical modeling language is a modified Petri Net.

20. The computer-readable storage medium of claim 19, wherein the method further comprises:
receiving, by an execution engine, the one or more matrices;
performing, by the execution engine, a simulation of the control flow model based on the matrices;

detecting, by the execution engine a trigger of a specific execution element based on the association of the tokens with execution elements; and causing execution of portions of the source code linked to the specific execution element.

21. A method for executing a program which has been obfuscated a by representing the control flow of the computer program as data that is not source code, at least a part of the control flow of the source code has been extracted and represented as a control flow model using a mathematical modeling language, the modeling language including constructs for event elements representing events that occur during execution of the computer program, condition elements which represent conditions that occur during the execution of the computer program and execution elements which are linked to portions of the source code for executing functions, wherein arcs are used to link event elements with condition elements and execution elements and wherein tokens are associated with condition elements and execution elements to represent the state of execution of the computer program, the method comprising;

receiving the control flow model as control flow data that represents the control flow of the program and is not executable code;

performing a simulation of the control flow model based on the control flow data;

detecting a trigger of a specific execution element based on the association of the tokens with execution elements; and causing execution of portions of the source code linked to the specific execution element.

* * * * *